(No Model.)
W. H. BROWN.
SHAFT FOR STEAMSHIPS.
No. 376,135. Patented Jan. 10, 1888.
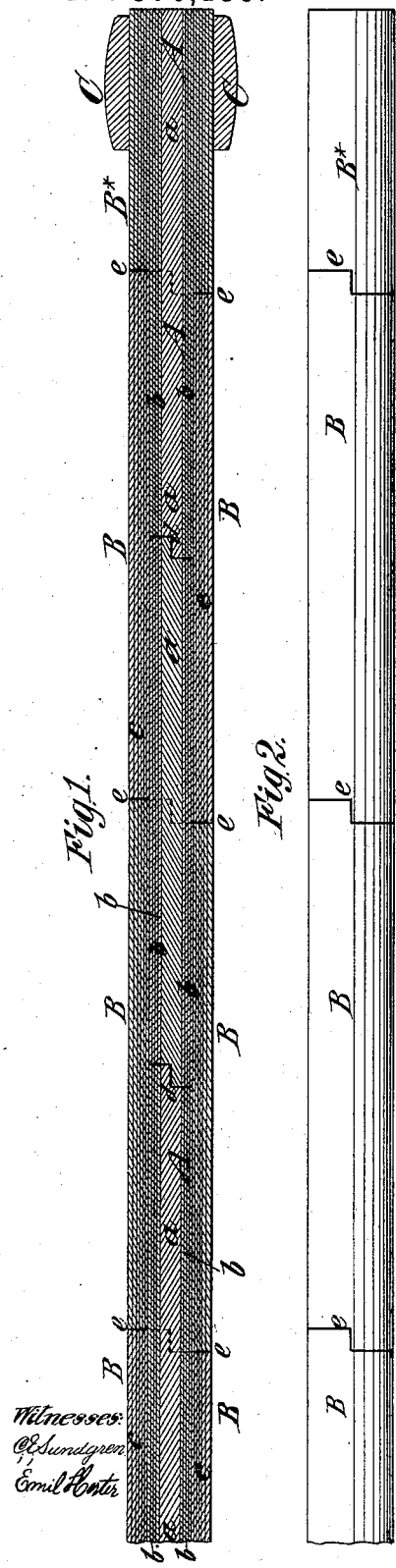
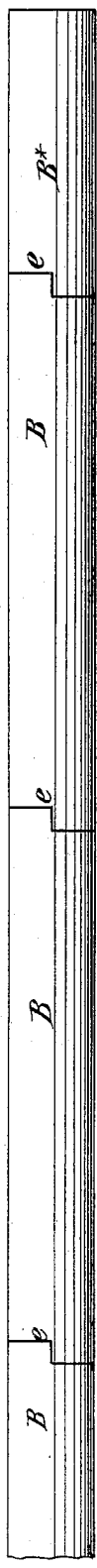
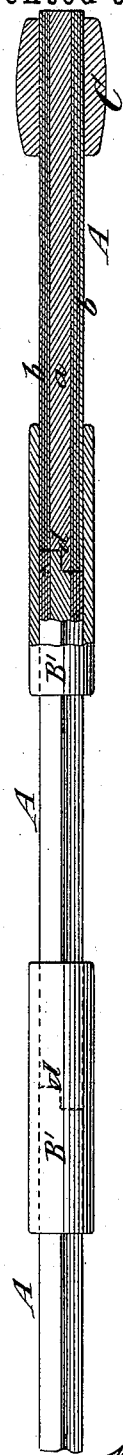
Witnesses:
C. E. Sundgren
Emil Hoeter
Inventor:
William Henry Brown
by his attys
Brown & Hall

United States Patent Office.

WILLIAM HENRY BROWN, OF NEW YORK, N. Y., ASSIGNOR TO THE BROWN'S SEAMLESS METAL COMPANY, OF JERSEY CITY, NEW JERSEY.

SHAFT FOR STEAMSHIPS.

SPECIFICATION forming part of Letters Patent No. 376,135, dated January 10, 1888.

Application filed July 17, 1885. Renewed June 17, 1887. Serial No. 241,611. (No model.)

*To all whom it may concern:*

Be it known that I, WILLIAM HENRY BROWN, of the city and county of New York, in the State of New York, have invented a new and useful Improvement in Shafts for Steamships and other Purposes, of which the following is a specification.

My invention is more particularly intended for the propeller-shafts of steam-vessels; but it may be embodied in other shafts which are required to transmit great power and are subject in use to violent shocks and torsional strain.

In order to increase the strength of propeller-shafts proportionate to their weight, they have been made tubular, and they have also been made, both solid and tubular, of steel, in order to increase their strength. The production of a steel shaft of large size which is solid and free throughout its diameter from fissures, flaws, or weak places is very difficult, if not impossible, to accomplish, and as a consequence steel shafts which are so large that they would have ample surplus strength if solid and perfect throughout are often broken by comparatively slight strain.

The objects of my invention are to provide a shaft, preferably of steel, in which the metal throughout is of uniform quality and possesses in a high degree the strength to resist tensile and torsional strain, and which may be readily repaired, if broken, by simply removing one of the sections thereof and substituting a duplicate section, one or more of which duplicate sections may be kept in reserve or carried on board the vessel.

In carrying out my invention I make the shaft in sections which have or may have their ends so formed as to interlock one with another, and each section is composed of seamless drawn tubes, of steel or other metal, superposed or drawn one upon another, so as to form a composite body uniform in hardness, tenacity, and strength throughout its thickness. The shaft and the tubes from which it is formed I prefer to make of hexagonal or other polygonal transverse section, and the center may be left hollow or filled with a similarly-shaped core or center, which may be of drawn steel and serve as a mandrel on which the first or innermost tube of the series is drawn. I may connect the sections of this shaft by couplings which consist of sleeves shaped internally to fit the exterior of the shaft and having a cylindric exterior, which enables them to serve as journals fitting bearings whereby the shaft is supported; but I prefer to re-enforce the shaft by an external covering or casing consisting of tubular sections which lap over and break joints with the sections of the shaft, and the ends of which are notched or dogged one into another, so as to form a covering or re-enforcement to the shaft which is continuous from one end to the other of the shaft.

The sections of the external covering or re-enforcement may be composed of seamless tubes superposed or drawn one on another, the interior of the sections being hexagonal or of other polygonal form to fit the exterior of the shaft-sections, and the exterior of the covering or re-enforcing sections being cylindric, so as to form a journal at any point at which a bearing may be advantageously arranged.

In case of the breakage of an inner or outer section of a shaft of the construction above described, it is only necessary to disconnect the engine and slide the sections of the shaft lengthwise in order to remove the broken section and replace it by a duplicate section.

In the accompanying drawings, Figure 1 is a longitudinal section of a portion of a shaft embodying my invention, and having outer sections interlocked together at their ends to form a covering or re-enforcement continuous throughout the length of the shaft. Fig. 2 is an external view of such shaft. Fig. 3 is a transverse section of the shaft, and Fig. 4 a similar section of the outer covering or re-enforcement. Fig. 5 is a partial longitudinal section and side view of a shaft in which the sections are connected by couplings isolated from each other in a direction lengthwise of the shaft. Fig. 6 is an end view of the shaft shown in Fig. 5 and the hub of a propeller secured thereon, and Fig. 7 is a transverse section of the shaft and an end view of one of the couplings.

Similar letters of reference designate corresponding parts in all the figures.

The shaft proper, A, is composed of sections which may be of any length which can be conveniently constructed, and which will not be so long as to impede the handling of the sections in a vessel, as will be necessary to remove one section in case of breakage and replace it by another.

As here represented, each section consists of a core or center, a, and a number of seamless tubes, b, superposed one on another in the process of drawing, so as to form with the core a solid integral section. I prefer to make the tubes b of hexagonal, square, or other polygonal shape in transverse section and the core or center a of corresponding shape, as the tubes will thus be locked together and to the center or core and cannot turn on each other or on the center or core.

In some cases I may not retain the core or center and construct the shaft-sections solely of drawn tubes, the mandrel being withdrawn after the drawing of the tubes thereon is completed; but I prefer to draw the tubes upon the core or center a as a mandrel, and to then leave it in place within the tubes to form a part of the shaft. I prefer to make the core or center a of a bar of steel, condensed and hardened by drawing it through a die as many times as may be necessary, or by rolling, and the tubes b, I prefer also to make of mild steel, which may be readily drawn when hot or cold. The tubes b may be drawn to any desired degree of thickness—say from one-half inch to one inch—and it will be readily understood that this method of construction enables me to produce a shaft which will have throughout a degree of hardness, solidity, and strength to resist torsional strain, which could not possibly be obtained in a solid forged or rolled shaft of the same size, or even one much less in size.

I have here represented the shaft A as composed of four superposed tubes b on the solid core or center a; but any number of tubes may be used.

To re-enforce and strengthen the shaft A, and also to connect or couple together the sections of which it is made, I may in some cases employ tubular sections B, as shown in Figs. 1, 2, 3, and 4, which are of a size to slip outside the shaft-sections A, and form a covering or re-enforcement which is continuous from end to end of the shaft, as shown in Figs. 1 and 2. In other cases I may employ simple couplings, B', which are isolated from each other and simply lap on adjacent sections a little distance on each side of the joint between them, as shown in Fig. 5.

Each of the outer tubular sections, B, (shown in Figs. 1, 2, and 4) is built up of tubes c, drawn one upon another, as best shown in Fig. 4, the inner tubes being of a transverse section corresponding to that of the shaft A, and the outer tubes approaching a cylindric form on their exterior in order to give the outermost tube a circular periphery, so that it may serve as a journal to a bearing placed at any point thereon.

It will be observed that the polygonal bore of the tubular sections B, by fitting the polygonal exterior of the shaft-sections A, locks adjacent sections together, so that the rotary motion imparted by the engine to one end of the shaft will be transmitted to the propeller at the other end thereof. In order to additionally lock the shaft-sections A together, and likewise the outer tubular sections, B, I have shown the shaft-sections as notched, dogged, or halved into each other at their adjacent ends, as shown at d, and the outer tubular sections, B, as correspondingly notched, dogged, or halved into each other, as shown at e, for a like purpose.

The end tubular section, B*, on which is secured the hub C of the propeller, may be of about half the length of the other sections, and may be welded or otherwise secured fast to the shaft A, and it will be seen from Fig. 1 that the sections A of the shaft and B of the covering or re-enforcement break or lap joints relatively one to the other.

In Fig. 5 I have shown the propeller-hub C as secured directly on the shaft A, the hub having a polygonal bore to fit the shaft. In that figure, also, the couplings B', which are internally polygonal to fit the exterior of the shaft, are externally cylindric to serve as journals. These couplings may be of solid forged metal, or built up of tubes drawn one on another, as described with reference to the tubular sections B. In this case, also, the adjacent ends of shaft-sections are notched, dogged, or halved one into the other, as shown at d.

In case of breakage of any section A or B of the shaft or re-enforcement shown in Figs. 1 and 2, the engine can be uncoupled from the shaft and the sections thereof can be shifted lengthwise sufficiently to remove a broken section and replace it by a space-section. In case of breakage of any one of the shaft-sections A, (shown in Fig. 5,) it will only be necessary to slip the couplings B' lengthwise of the shaft and introduce a new section therein.

A shaft constructed in the manner described by me may be composed of sections A, having their ends cut square and provided with ordinary flanged couplings shrunk or otherwise secured upon them and bolted together.

What I claim as my invention, and desire to secure by Letters Patent, is—

1. As a new article of manufacture, a shaft consisting of seamless drawn tubes superposed or drawn one on another, substantially as herein described.

2. As a new article of manufacture, a shaft consisting of seamless drawn tubes superposed or drawn one on another, and having a polygonal or other transverse section, whereby the tubes are locked together and prevented from turning one relatively to another, substantially as herein described.

3. A shaft consisting of a core or center of rolled or drawn metal and tubes of corresponding form drawn or superposed on the core or center and one another, substantially as herein described.

4. The combination, with a shaft composed of sections each consisting of drawn tubes superposed one on another and having a polygonal transverse section, whereby they are locked against turning, of coupling-sleeves fitting the exterior of the shaft and serving to couple together the sections thereof, substantially as herein described.

5. The combination, with shaft-sections each composed of drawn tubes superposed one on another and having a polygonal transverse section, of coupling-sleeves each composed of drawn tubes superposed one on another and fitting the exterior of the shaft-sections, substantially as herein described.

6. The combination, with shaft-sections each composed of drawn tubes superposed one on another and having a polygonal exterior, of a re-enforcement or covering continuous throughout the shaft and composed of sections each consisting of drawn tubes superposed one on another, substantially as herein described.

7. The combination, with shaft-sections having their ends interlocked and each composed of drawn tubes superposed one on another and having a polygonal transverse section, of a covering or re-enforcement consisting of tubular sections fitting the exterior of the shaft from end to end thereof, and also having their ends interlocked, substantially as herein described.

8. The combination, with shaft-sections having their ends interlocked and each composed of drawn tubes superposed one on another and having a polygonal transverse section, of a covering or re-enforcement consisting of tubular sections, also having their ends interlocked and composed of drawn tubes superposed one on another, the interior of the tubular sections fitting the exterior of the shaft-sections and the exterior of the tubular sections being cylindric to serve as journals, substantially as herein described.

WM. HENRY BROWN.

Witnesses:
   FREDK. HAYNES,
   HENRY McBRIDE.